United States Patent
Suzuki

(10) Patent No.: US 6,782,353 B2
(45) Date of Patent: Aug. 24, 2004

(54) INSTRUMENT FOR MEASURING CHARACTERISTIC OF DATA TRANSMISSION SYSTEM WITH HIGH ACCURACY AND CLOCK REPRODUCING CIRCUIT USED THEREFOR

(75) Inventor: Seiya Suzuki, Atsugi (JP)

(73) Assignee: Anritsu Corporation, Tokyo (JP)

( * ) Notice: Subject to any disclaimer, the term of this patent is extended or adjusted under 35 U.S.C. 154(b) by 103 days.

(21) Appl. No.: 10/257,419

(22) PCT Filed: Feb. 20, 2002

(86) PCT No.: PCT/JP02/01454

§ 371 (c)(1),
(2), (4) Date: Oct. 10, 2002

(87) PCT Pub. No.: WO02/069555

PCT Pub. Date: Sep. 6, 2002

(65) Prior Publication Data

US 2003/0187622 A1 Oct. 2, 2003

(30) Foreign Application Priority Data

Feb. 23, 2001 (JP) ........................................ 2001-048681

(51) Int. Cl.[7] ............................ G06F 15/00; G11B 9/00; H04L 7/27; H04L 25/02
(52) U.S. Cl. ........................ 702/190; 327/154; 375/337; 369/47.32; 369/126
(58) Field of Search .............................. 702/17, 69, 70, 702/106, 107, 124, 190; 398/26; 369/47.32, 59.15, 126; 375/337; 327/154

(56) References Cited

U.S. PATENT DOCUMENTS 5,585,954 A    12/1996   Taga et al.

FOREIGN PATENT DOCUMENTS

| EP | 1 054 522 A2 | A2 | 11/2000 |
|---|---|---|---|
| GB | 2 349 520 | A | 11/2000 |
| JP | 55-110454 | A | 8/1980 |
| JP | 56-4955 | A | 1/1981 |
| JP | 59-125142 | A | 7/1984 |
| JP | 4-4633 | A | 1/1992 |
| JP | 5-75588 | A | 3/1993 |
| JP | 5-70044 | U | 9/1993 |
| JP | 6-164550 | A | 6/1994 |
| JP | 7-154378 | A | 6/1995 |
| JP | 11-313052 | A | 11/1999 |
| JP | 2000-307663 | A | 11/2000 |
| JP | 2001-7866 | A | 1/2001 |
| JP | 2001-197049 | A | 7/2001 |

*Primary Examiner*—John Barlow
*Assistant Examiner*—John Le
(74) *Attorney, Agent, or Firm*—Frishauf, Holtz, Goodman & Chick, P.C.

(57) ABSTRACT

The present invention provides a measuring device which extracts, from an inputted data signal, a clock signal in which there is little internal occurrence of absence or phase fluctuations, and correctly carries out measurement of an error ratio or jitter or wander accompanying transmission of the data signal by using the clock signal. A band-pass filter extracts, from the inputted data signal, a signal component having a same frequency as that of a clock signal to be regenerated. A binarizing circuit binarizes the extracted signal component at a predetermined threshold value, and outputs it as a regenerated clock signal. At this time, the binarizing circuit is configured such that, when there is a same code continuing period in the data signal, the binarizing circuit binarizes the signal outputted during the period by relaxation vibration at an interior of the band-pass filter, so as to compensate for absence of the clock signal during the period. A calculating module calculates at least one of the error ratio, the jitter, and the wander based on the regenerated clock signal from the binarizing circuit.

15 Claims, 9 Drawing Sheets

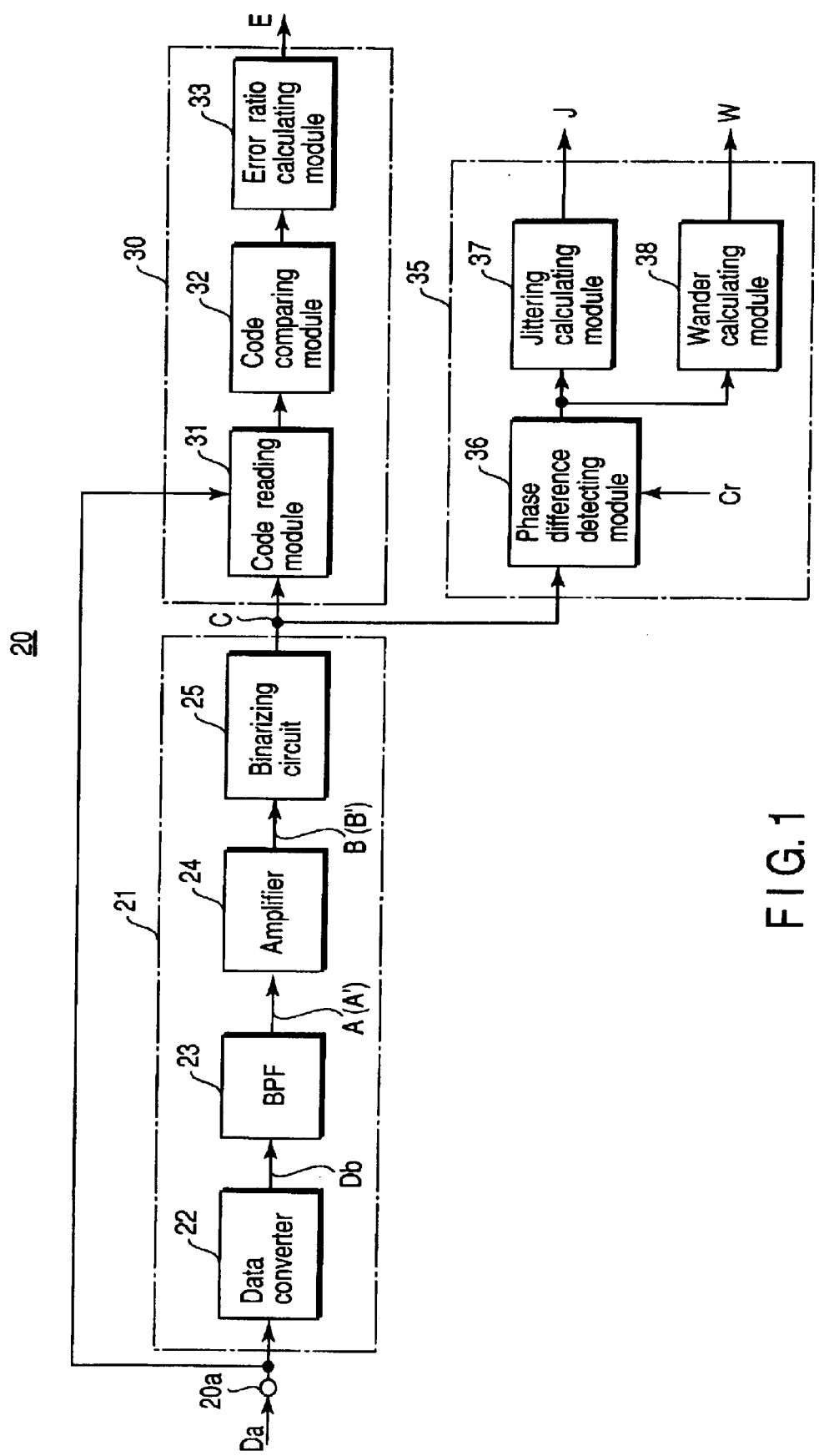
F I G. 1

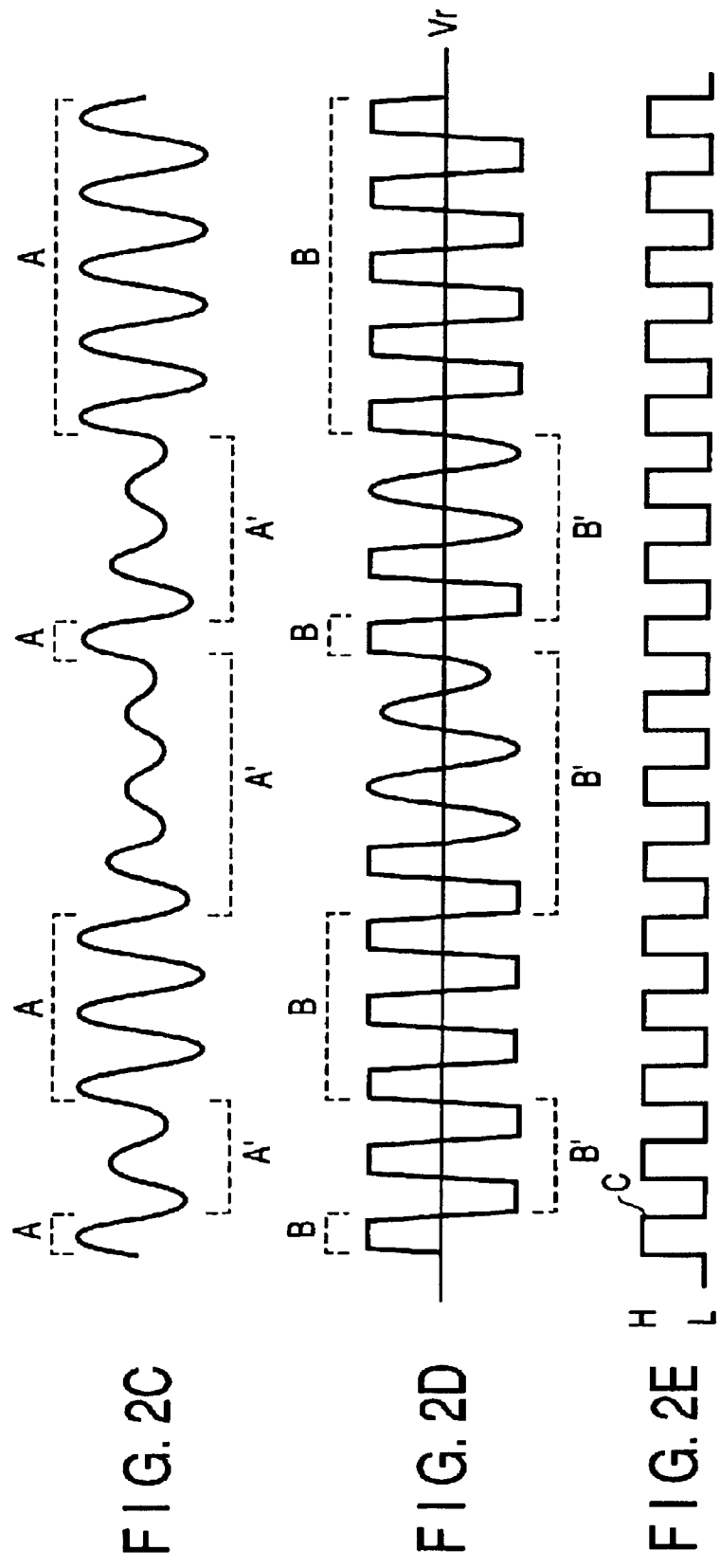

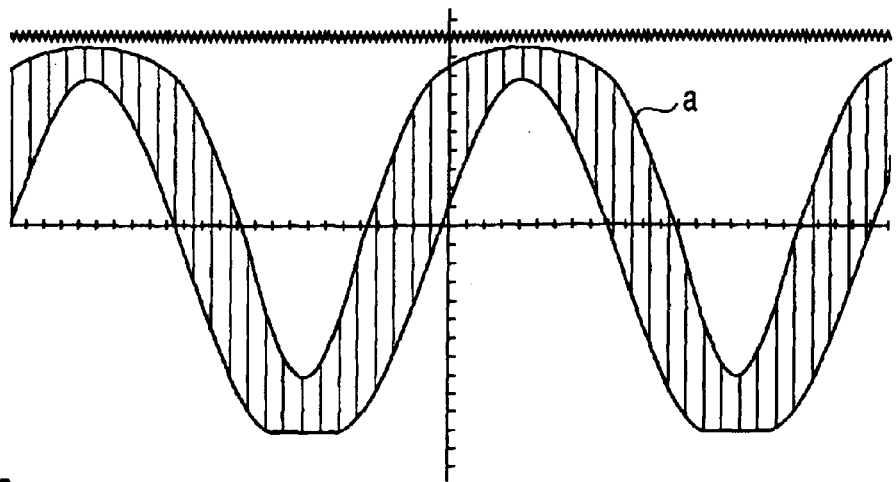
FIG. 3  Binarizing circuit output waveform
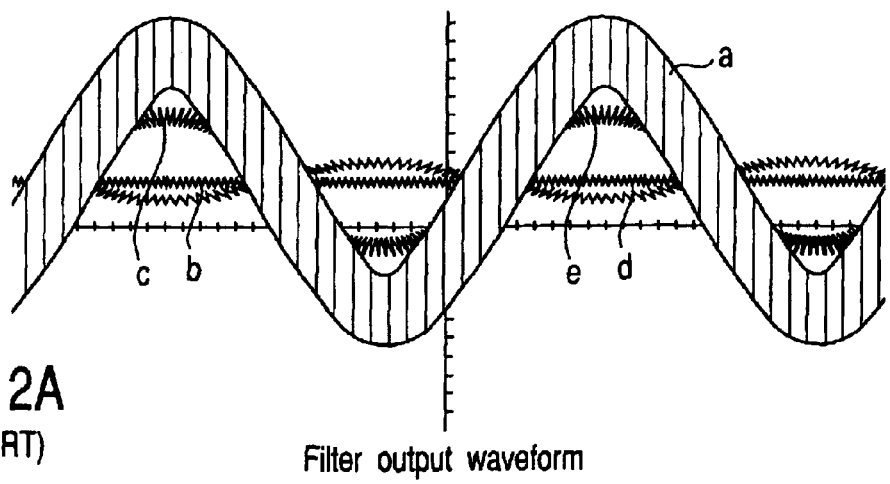
FIG. 12A
(PRIOR ART)  Filter output waveform
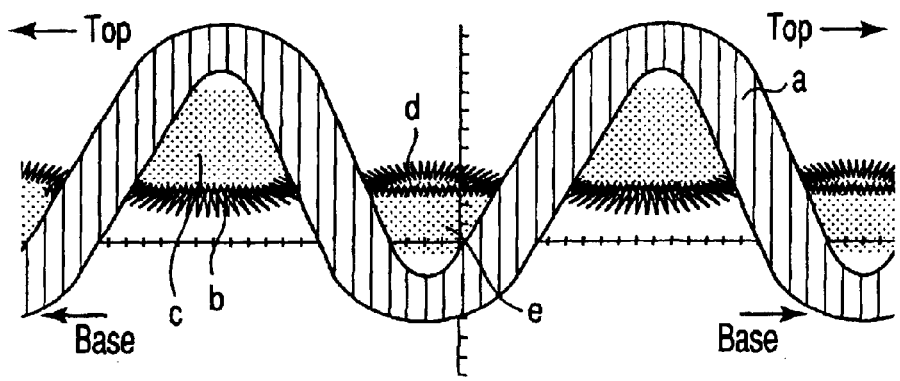
FIG. 12C
(PRIOR ART)  Saturation type amplifier output waveform

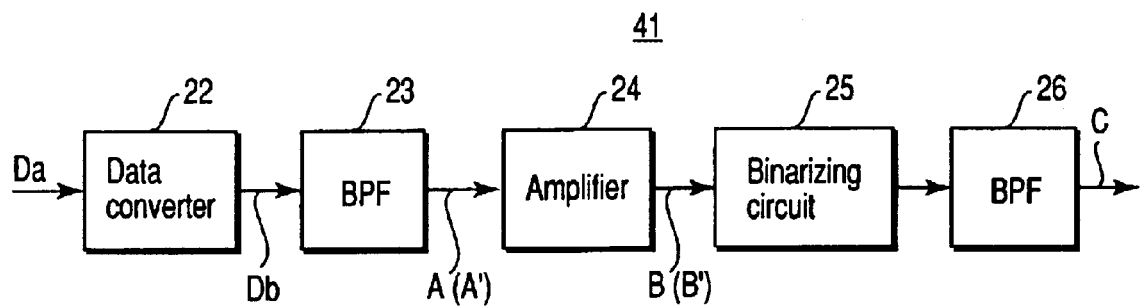
F I G. 4
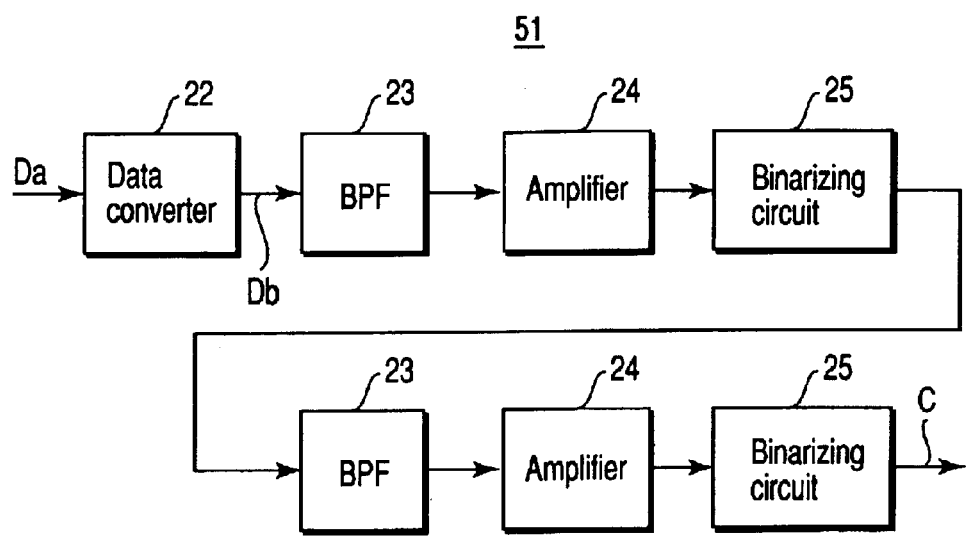
F I G. 5

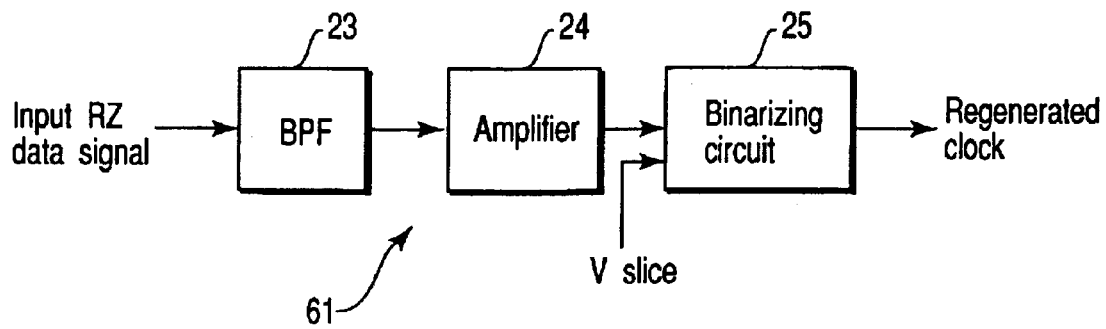
FIG. 6A
| Same code continuing (Byte) | Threshold value voltage V slice (V) | Remaining jittering (reference) Ulpp |
|---|---|---|
| 6 | -0.435 | 0.037~0.046 |
| 5 | -0.423 | 0.039~0.042 |
| 4 | -0.384 | 0.035~0.040 |
| 3 | -0.384 | 0.034~0.037 |
FIG. 6B
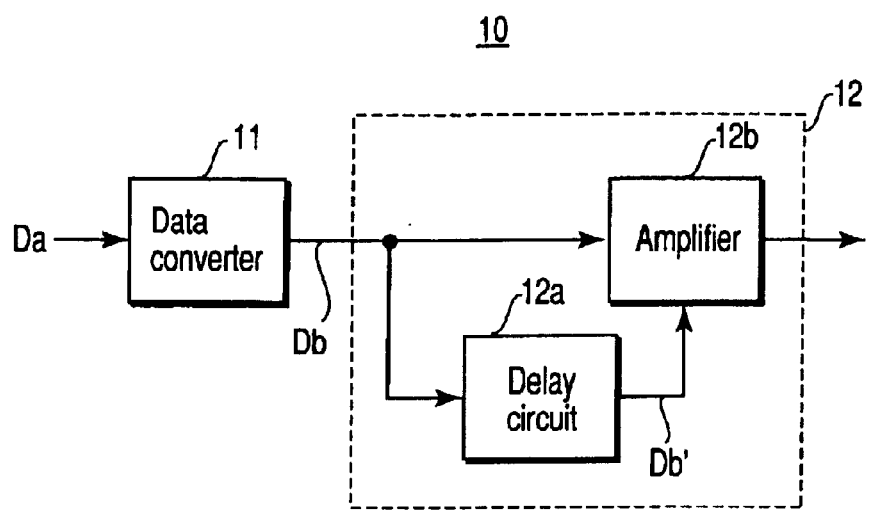
FIG. 9 (PRIOR ART)

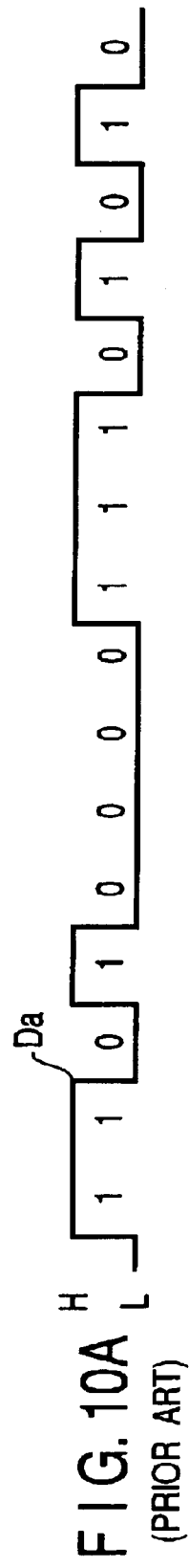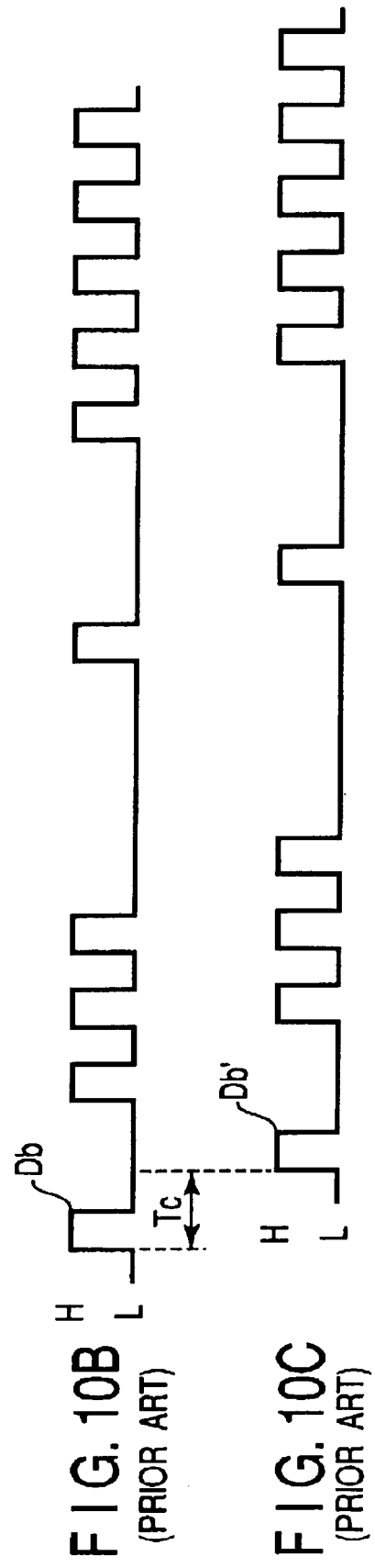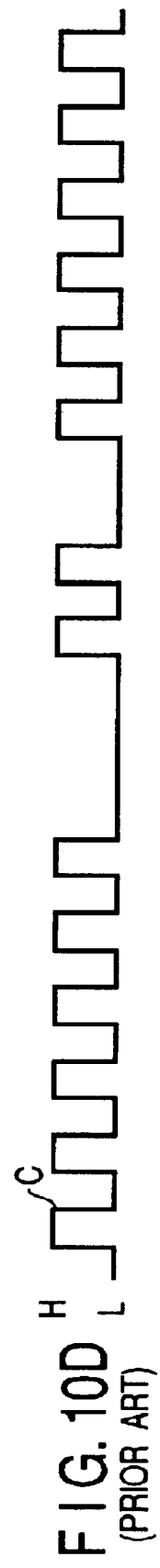
FIG. 10A (PRIOR ART)
FIG. 10B (PRIOR ART)
FIG. 10C (PRIOR ART)
FIG. 10D (PRIOR ART)

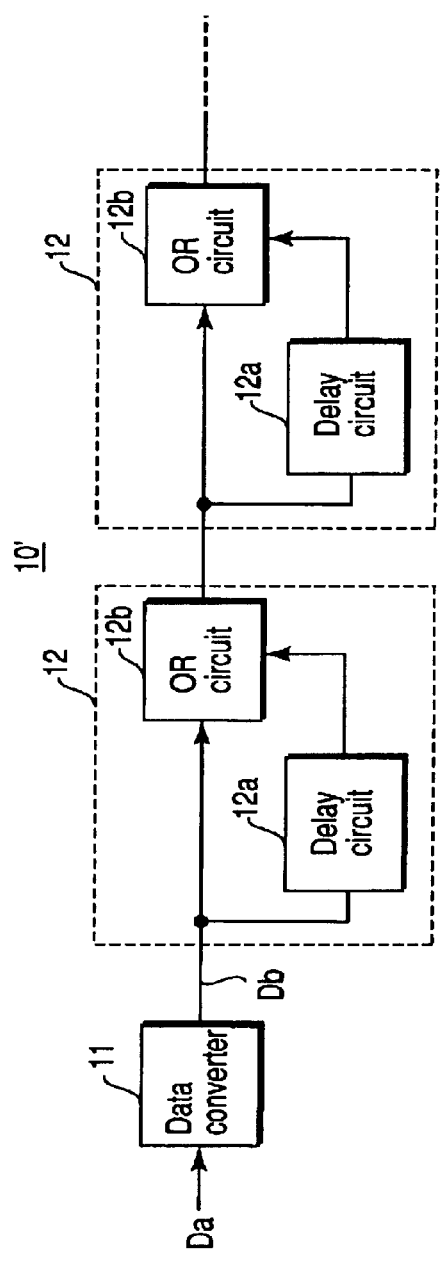
FIG. 11 (PRIOR ART)
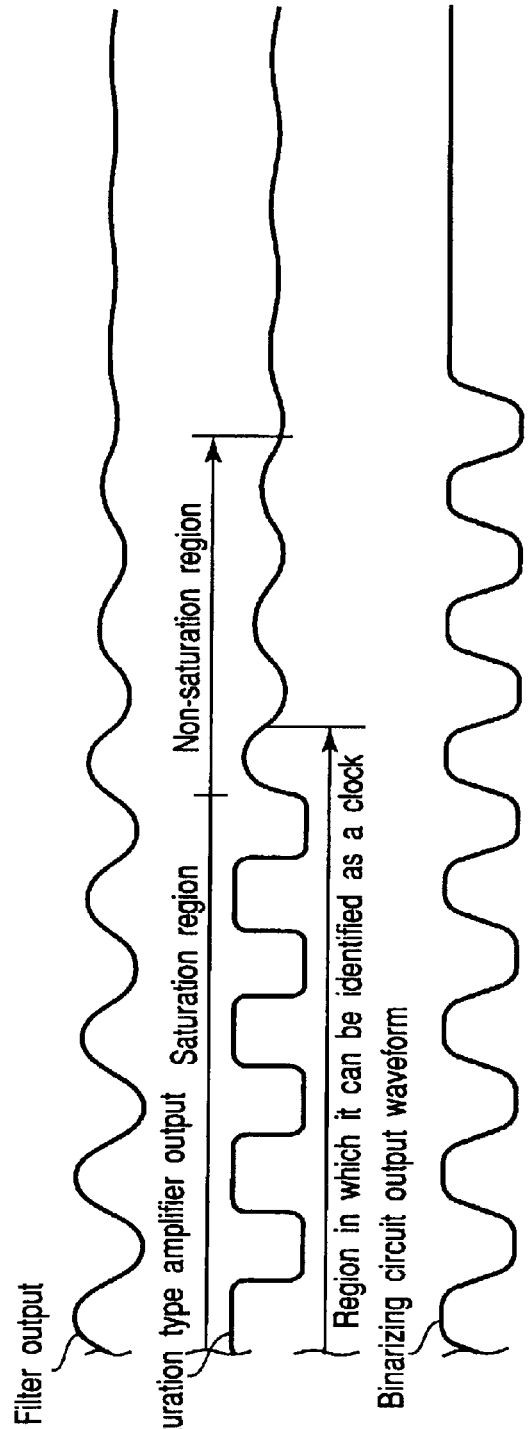
FIG. 12B (PRIOR ART)
FIG. 12D (PRIOR ART)
FIG. 12E

US 6,782,353 B2

INSTRUMENT FOR MEASURING CHARACTERISTIC OF DATA TRANSMISSION SYSTEM WITH HIGH ACCURACY AND CLOCK REPRODUCING CIRCUIT USED THEREFOR

TECHNICAL FIELD

The present invention relates to a measuring device measuring characteristics of a data transmission system with high accuracy and a clock regenerating circuit used therein, and in particular, to a measuring device adopting a technique for correctly regenerating a clock signal, from a data signal formed from RZ method bit codes, even during a period in which the data signal continues for a plurality of bits at the same level, and measuring, with high accuracy, the error ratio, jitter, wander characteristics, or the like accompanying transmission of the data signal, and to a clock regenerating circuit used therein.

BACKGROUND ART

Generally, in a data transmission system transmitting data signals or a measuring device or the like carrying out measurement of the jitter characteristic or the like of the data transmission system, the codes of the data signal are read and measurement of the jitter or wander characteristic is carried out, by a clock signal regenerated from the data signal.

FIG. 9 is a block diagram showing a configuration of a conventional clock regenerating circuit 10 used in such a measuring device.

In FIG. 9, a data converter 11 converts data signal Da inputted by the NRZ (Non Return to Zero) method to data signal Db of the RZ (Return to Zero) method.

Here, the RZ method is a method once returning the amplitude of the data signal to a reference level between some bit code and the next bit code.

Further, the NRZ method is a method not returning the amplitude of the data signal to the reference level between some bit code and the next bit code.

Further, in usual data transmitting systems, transmission of data is carried out by the NRZ method is since variations of the level are few even in the case of the similar code array.

The data converter 11 generates and outputs a pulse of a predetermined width synchronized with the rising timing of the data signal Da inputted by the NRZ method and the inverted signal of the data signal Da.

For example, as shown in FIG. 10A, when the NRZ method data signal Da corresponding to a code array of 0, 1 is inputted, as shown in FIG. 10B, the RZ method data signal Db, formed from a pulse train having a predetermined width synchronized with the rise and fall of the data signal Da, is outputted from the data converter 11.

Here, the data signal Db, within a period in which the codes of the data signal Da are inverted at each bit, is a pulse train which rises to a high level and returns to a low level at each code.

Further, the data signal Db, within a period in which the codes of the data signal Da are equal and continue, keeps a low level.

Accordingly, if the data signal Db is used as a clock signal, the clock signal is absent for the period in which the codes of the data signal Da are equal and continue.

If there is such an absence period, there is the problem that operation at the side of another circuit using the clock signal cannot be ensured.

Therefore, in a conventional clock regenerating circuit 10, as shown in FIG. 9, due to a delay adding circuit 12 being provided at a subsequent stage of the data converter 11, absence of the clock signal as described above is compensated for.

In an OR circuit (adding circuit) 12b, the delay adding circuit 12 logically-adds the data signal Db outputted by the RZ method from the data converter 11 and a signal Db' in which the data signal Db is delayed by a predetermined time T by a delay circuit 12a, and outputs them.

Here, for example, the delay time T of the delay circuit 12a is set to an integer multiple of a period Tc of the clock signal to be regenerated. For example, if the delay time T=Tc, the data signal Db', in which the data signal Db is delayed by one clock as shown in FIG. 10C, is outputted from the delay circuit 12a.

Further, as shown in FIG. 10D, the logical sum of the data signal Db and the data signal Db', in which the data signal Db is delayed by one clock, is outputted from the OR circuit 12b.

The output shown in FIG. 10D is a signal where pulses are inserted one by one in each period in which a pulse train is not outputted in FIG. 10B. If this is made to be the clock signal, the absence periods can be eliminated or shortened.

However, as described above, when the delay time T of the delay circuit 12a of the delay adding circuit 12 is set to the period Tc of the clock signal as described above, because only one pulse can be supplemented at the head of each absence period, there is the problem that the effect of shortening the absence period is low.

In order to resolve the above, further shortening of the absence period of the clock signal by providing the delay adding circuit 12 at a plurality of steps in series as a clock regenerating circuit 10' shown in FIG. 11, is considered.

However, there are the problems that, here, the configuration as the clock regenerating circuit becomes complicated, and further, phase fluctuations occur in the regenerated clock signal due to variations or dispersion of the delay time T in each step, and identification of data and measurement of jitter or the like by the clock signal cannot be correctly carried out.

On the other hand, in Jpn. Pat. Appln. KOKAI Publication Nos. 11-313052 and 2000-197049, clock regenerating circuits are disclosed, regenerating a clock signal by using a band-pass filter having a predetermined band characteristic for extracting a clock signal component from an inputted data signal, and a saturation amplifier or an AGC amplifier amplifying the clock signal component extracted by the band-pass filter to a predetermined level.

However, if a portion, in which the same code component continues markedly, exists in the data signal inputted to such a clock regenerating circuit, in the clock signal outputted from the band-pass filter, as shown in FIG. 12A, in addition to an original clock signal component a, various noise components b, c, d, e, or the like based on relaxation vibrations at the interior of the band-pass filter described later are superposed and appear.

Here, relaxation vibrations at the interior of the band-pass filter are, when a period in which the same code component continues extremely exists in the data signal, a vibration phenomenon at the interior of the band-pass filter with respect to the data signal inputted until immediately before that period, as shown in FIG. 12B.

Such various noise components b, c, d, e, or the like based on relaxation vibration at the interior of the band-pass filter appear during the period when relaxation vibrations exist.

The relaxation vibration at the interior of the band-pass filter depends on wideness/narrowness of the band characteristic of the band-pass filter.

Namely, when the band characteristic of a band-pass filter extracting, from a data signal transmitted at a predetermined carrier wave frequency, a signal component having the same frequency as the clock signal to be regenerated, is regulated to a narrow band characteristic in accordance with the aforementioned predetermined carrier wave frequency, relaxation vibration at the interior of the band-pass filter markedly appears.

In accordance therewith, in the clock signal outputted from the saturation amplifier or the AGC amplifier, as shown in FIG. 12C, in addition to the original clock signal component a', various noise components b', c', d', e', or the like are superposed and appear.

Further, in the period in which relaxation vibration at the interior of the band-pass filter exists, such a saturation amplifier or AGC amplifier works in a non-saturation region as shown in FIG. 12C.

Therefore, the device of the saturation amplifier or the AGC amplifier merely carries out waveform shaping, and the output in the period in which relaxation vibration at the interior of the band-pass filter exists is not identified as a clock signal. Therefore, the device has not the same code tolerance.

As a result, in the clock regenerating circuit regenerating the clock signal by using such a saturation amplifier or AGC amplifier, as shown in FIG. 12D, it cannot be correctly regenerated as a clock signal in the same code continuing period. Therefore, absence of the clock signal is caused, and phase fluctuations tend to occur easily in the regenerated clock signal.

Accordingly, in the same way as described above, in such a clock signal, there is the problem that identification of a data signal and measurement of jitter or the like cannot be correctly carried out.

DISCLOSURE OF INVENTION

An object of the present invention is to resolve the problems as described above, and to provide a measuring device which can correctly carry out measurement of an error ratio, jitter, wander, or the like accompanying transmission of a data signal due to occurrences of absence and phase fluctuations of a clock signal being able to be reliably prevented with a simple configuration.

Further, another object of the present invention is to provide a clock regenerating circuit for use in a measuring device which can correctly carry out measurement of an error ratio, jitter, wander, or the like accompanying transmission of a data signal due to occurrences of absence and phase fluctuations of a clock signal being able to be reliably prevented with a simple configuration.

In accordance with a first aspect of the present invention, there is provided a measuring device comprising:

a data converter (22) which converts a data signal transmitted at a predetermined carrier wave frequency from an NRZ method data signal to an RZ method data signal;

a band-pass filter (23) which extracts a signal component having a frequency the same as that of a clock signal to be regenerated from the RZ method data signal converted by the data converter, and has a predetermined band characteristic regulated in accordance with the predetermined carrier wave frequency;

a binarizing circuit (25) which binarizes, at a predetermined threshold value, the signal component extracted by the band-pass filter, and outputs a binarized signal as the clock signal to be regenerated, and when there is a period in which the data signal inputted to the band-pass filter continues for a plurality of bits at the same level, the binarizing circuit being configured so as to compensate for absence of the clock signal during the period by binarizing, at the predetermined threshold value, the signal which the band-pass filter outputs during the period due to relaxation vibration at an interior of the band-pass filter with respect to the data signal inputted until immediately before the period; and calculating modules (33, 37, 38) which calculate at least one of an error ratio, jitter, and wander accompanying transmission of the data signal, based on the clock signal outputted from the binarizing circuit.

In accordance with a second aspect of the present invention, there is provided a measuring device according to the first aspect, wherein the measuring device is a device carrying out measurement of the error ratio, and the calculating module, in an error measuring portion, comprises:

a code reading module (31) which reads a code of the NRZ method data signal based on the clock signal outputted from the binarizing circuit;

a code comparing module (32) which compares the code array read by the code read module with a reference code array; and an error calculating module (33) which calculates the error ratio based on results of comparison of the code comparing module.

In accordance with a third aspect of the present invention, there is provided a measuring device according to the first aspect, wherein the measuring device is a device carrying out measurement of at least one of the jitter and the wander, and the band-pass filter has a predetermined band characteristic regulated in accordance with the predetermined carrier wave frequency and measurement of at least one of the jitter and the wander;

when there is a period in which the data signal inputted to the band-pass filter continues for a plurality of bits at the same level, the binarizing circuit binarizes, at a threshold value corresponding to the measurement of at least one of the jitter and the wander, the signal which the band-pass filter outputs during the period due to relaxation vibration at the interior of the band-pass filter with respect to the data signal inputted until immediately before the period; and the calculating module, in a jitter/wander measuring portion, comprises:

a phase difference detecting module (36) which detects a phase difference of the clock signal outputted from the binarizinq circuit and a reference clock signal; and calculating modules (37, 38) which calculate at least one of the jitter and the wander based on the phase difference detected by the phase difference detecting module.

In accordance with a fourth aspect of the present invention, there is provided a measuring device according to the first aspect, wherein the band-pass filter and the binarizing circuit are made to be one circuit group and a plurality of the one circuit group are connected in series.

In accordance with a fifth aspect of the present invention, there is provided a measuring device according to the first aspect, further comprising:

an amplifier (24) which is provided between the band-pass filter and the binarizing circuit, and amplifies the signal component extracted by the band-pass filter and outputs it to the binarizing circuit.

In accordance with a sixth aspect of the present invention, there is provided a measuring device according to the first aspect, wherein the threshold value of the binarizing circuit is set to a threshold value voltage able to ensure a desired same code continuing tolerance.

In accordance with a seventh aspect of the present invention, there is provided a measuring device according to the first aspect, further comprising:

a phase difference detecting module (136) for calculating a threshold value, comprising: a phase synchronizing loop module (139) including a phase comparator (136A) which detects a phase difference between the clock signal outputted from the binarizing circuit and the reference clock signal and a voltage controlling oscillator module (138) which outputs a signal having a predetermined frequency as the reference clock signal to the phase comparator based on a voltage output corresponding to the phase difference detected by the phase comparator 136A; and a clock signal absence detecting module (140) which detects absence of the clock signal during the period in the clock signal outputted from the binarizing circuit based on the phase difference detected by the phase comparator 136A of the phase synchronizing loop module; and a threshold value calculating module (143) which calculates an optimal threshold value to compensate for absence of the clock signal during the period in the binarizing circuit and supplies it to the binarizing circuit, based on the voltage output corresponding to the phase difference detected by the phase comparator of the phase difference detecting module for calculating the threshold value, when absence of the clock signal during the period is detected by the clock signal absence detecting module of the phase difference detecting module for calculating the threshold value.

In accordance with an eighth aspect of the present invention, there is provided a measuring device according to the seventh aspect, wherein the measuring device is a device carrying out measurement of at least one of the jitter and the wander, and the band-pass filter has a predetermined band characteristic regulated in accordance with the predetermined carrier wave frequency and measurement of at least one of the jitter and the wander;

when there is a period in which the data signal inputted to the band-pass filter continues for a plurality of bits at the same level, the binarizing circuit binarizes, at a threshold value corresponding to the measurement of at least one of the jitter and the wander, the signal which the band-pass filter outputs during the period due to relaxation vibration at the interior of the band-pass filter with respect to the data signal inputted until immediately before the period;

the calculating module, in a jitter/wander measuring portion (35), comprises:

a phase difference detecting module (36) which detects a phase difference of the clock signal outputted from the binarizing circuit and a reference clock signal; and calculating modules (37, 38) which calculate at least one of the jitter and the wander based on the phase difference detected by the phase difference detecting module; and the phase difference detecting module (36) of the jitter/wander measuring portion is also used as the phase difference detecting module (136) which calculates the threshold value.

In accordance with a ninth aspect of the present invention, there is provided a clock regenerating circuit for use in a measuring device measuring at least one of an error ratio, jitter, and wander accompanying transmission of a data signal, based on a clock signal outputted from a binarizing circuit, the clock degenerating circuit comprising:

a data converter (22) which converts a data signal transmitted at a predetermined carrier wave frequency from an NRZ method data signal to an RZ method data signal;

a band-pass filter (23) which extracts a signal component having a frequency the same as that of a clock signal to be regenerated from the RZ method data signal converted by the data converter, and has a predetermined band characteristic regulated in accordance with the predetermined carrier wave frequency; and a binarizing circuit (25) which binarizes, at a predetermined threshold value, the signal component extracted by the band-pass filter, and outputs a binarized signal as the clock signal to be regenerated, and when there is a period in which the data signal inputted to the band-pass filter continues for a plurality of bits at the same level, the binarizing circuit being configured so as to compensate for absence of the clock signal during the period by binarizing, at the predetermined threshold value, the signal which the band-pass filter outputs during the period due to relaxation vibration at an interior of the band-pass filter with respect to the data signal inputted until immediately before the period.

In accordance with a tenth aspect of the present invention, there is provided a clock regenerating circuit according to the ninth aspect, wherein when the measuring device is a measuring device carrying out measurement of at least one of the jitter and the wander, the band-pass filter has a predetermined band characteristic regulated in accordance with the predetermined carrier wave frequency and measurement of at least one of the jitter and the wander; and when there is a period in which the data signal inputted to the band-pass filter continues for a plurality of bits at the same level, the binarizing circuit binarizes, at a threshold value corresponding to the measurement of at least one of the jitter and the wander, the signal which the band-pass filter outputs during the period due to relaxation vibration at the interior of the band-pass filter with respect to the data signal inputted until immediately before the period.

In accordance with a eleventh aspect of the present invention, there is provided a clock regenerating circuit according to the ninth aspect, wherein the band-pass filter and the binarizing circuit are made to be one circuit group and a plurality of the one circuit group are connected in series.

In accordance with a twelfth aspect of the present invention, there is provided a clock regenerating circuit according to the ninth aspect, further comprising:

an amplifier (24) which is provided between the band-pass filter and the binarizing circuit, and amplifies the signal component extracted by the band-pass filter and outputs it to the binarizing circuit.

In accordance with a thirteenth aspect of the present invention, there is provided a clock regenerating circuit according to the ninth aspect, wherein the threshold value of the binarizing circuit is set to a threshold value voltage able to ensure a desired same code continuing tolerance.

In accordance with a fourteenth aspect of the present invention, there is provided a clock regenerating circuit according to the ninth aspect, further comprising:

a phase difference detecting module (136) for calculating a threshold value, comprising: a phase synchronizing loop module (139) including a phase comparator (136A) which detects a phase difference between the clock signal outputted from the binarizing circuit and the reference clock signal and a voltage controlling oscillator module (138) which outputs a signal having a predetermined frequency as the reference clock signal to the phase comparator based on a voltage output corresponding to the phase difference detected by the phase comparator; and a clock signal absence detecting module (140) which detects absence of the clock signal during the period in the clock signal outputted from the binarizing circuit based on the phase difference detected by the phase comparator of the phase synchronizing loop module; and a threshold value calculating module (143) which calculates an optimal threshold value to compensate for absence of the clock signal during the period in the binarizing circuit and supplying it to the binarizing circuit, based on the voltage output corresponding to the phase difference detected by the phase comparator of the phase difference detecting module for calculating a threshold value, when absence of the clock signal during the period is detected by the clock signal absence detecting module of the phase difference detecting module for calculating a threshold value.

In accordance with a fifteenth aspect of the present invention, there is provided a clock regenerating circuit according to the fourteenth aspect, wherein when the measuring device is a device carrying out measurement of at least one of the jitter and the wander, the band-pass filter has a predetermined band characteristic regulated in accordance with the predetermined carrier wave frequency and measurement of at least one of the jitter and the wander;

when there is a period in which the data signal inputted to the band-pass filter continues for a plurality of bits at the same level, the binarizing circuit binarizes, at a threshold value corresponding to the measurement of at least one of the jitter and the wander, the signal which the band-pass filter outputs during the period due to relaxation vibration at the interior of the band-pass filter with respect to the data signal inputted until immediately before the period;

the calculating module, in a jitter/wander measuring portion (35), comprises:

a phase difference detecting module (36) which detects a phase difference of the clock signal outputted from the binarizing circuit and a reference clock signal; and calculating modules (37, 38) which calculate at least one of the jitter and the wander based on the phase difference detected by the phase difference detecting module; and the phase difference detecting module (36) of the jitter/wander measuring portion (35) is also used as the phase difference detecting module (136) for calculating a threshold value.

BRIEF DESCRIPTION OF DRAWINGS

FIG. 1 is a block diagram showing a configuration of a first embodiment of a measuring device and a clock regenerating circuit used therein according to the present invention;

FIGS. 2A to 2E are timing charts shown for explaining operation of the clock regenerating circuit for use in the measuring device of FIG. 1;

FIG. 3 is an output waveform diagram of a binarizing circuit shown for explaining the operation of the clock regenerating circuit for use in the measuring device of FIG. 1;

FIG. 4 is a block diagram showing a configuration of a second embodiment of a clock regenerating circuit for use in the measuring device according to the present invention;

FIG. 5 is a block diagram showing a configuration of a third embodiment of a clock regenerating circuit for use in the measuring device according to the present invention;

FIG. 6A is a block diagram showing a configuration of main portions of a fourth embodiment of a clock regenerating circuit for use in the measuring device according to the present invention;

FIG. 6B is a figure showing the relationship of the same code tolerance with respect to a threshold value of the binarizing circuit in the clock regenerating circuit of FIG. 6A, made into a table;

FIG. 9 is a block diagram showing a configuration of a conventional clock regenerating circuit;

FIGS. 10A to 10D are timing charts shown for explaining operation of the conventional clock regenerating circuit;

FIG. 11 is a block diagram showing another configuration of a conventional clock regenerating circuit;

FIGS. 12A to 12D are output waveform diagrams of a band-pass filter and output waveform diagrams of a saturation amplifier shown for explaining operation of the conventional clock regenerating circuit regenerating a clock signal by using a saturation amplifier or an AGC amplifier amplifying a clock signal component, extracted by the band-pass filter, to a predetermined level; and FIG. 12E is an output waveform diagram of the binarizing circuit shown for explaining operation of the clock regenerating circuit for use in the measuring device of FIG. 1 according to the present invention.

BEST MODE FOR CARRYING OUT OF THE INVENTION

Figure 7:
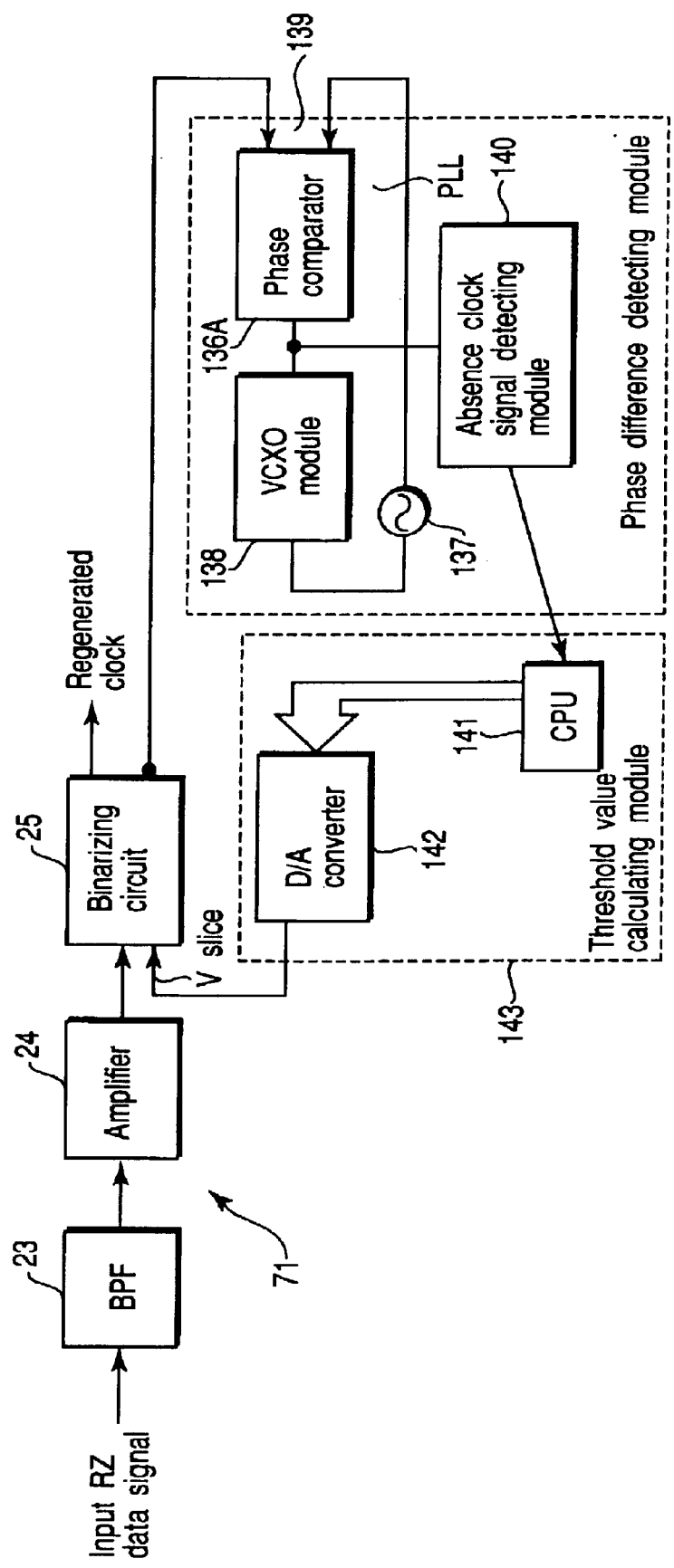
FIG. 7 is a block diagram showing a configuration of main portions of a fifth embodiment of a clock regenerating circuit for use in the measuring device according to the present invention.

Hereinafter, respective embodiments of the present invention will be described with reference to the figures.

First Embodiment

FIG. 1 is a block diagram showing a configuration of a first embodiment of a measuring device 20 and a clock regenerating circuit 21 used therein according to the present invention.

This measuring device 20 is applied to an error measurement and a jitter/wander measurement of a data transmitting system.

This measuring device 20 has the clock regenerating circuit 21, an error measuring portion 30, and a jitter/wander measuring portion 35.

First, a data converter 22 of the clock regenerating circuit 21 converts an NRZ method data signal Da, transmitted at a predetermined carrier wave frequency inputted from an input terminal 20a, to an RZ method data signal Db.

The data signal Db outputted from the data converter 22 is inputted to a band-pass filter 23.

This band-pass filter 23 selectively extracts a signal component having a frequency which is the same as that of a clock signal to be regenerated, by a resonance element, for example, the resonance effect of a dielectric multilayer film.

In this case, the band characteristic of the band-pass filter is regulated so as to have a predetermined wide band characteristic in accordance with the aforementioned predetermined carrier wave frequency (fc) in consideration of the measurement of the jitter characteristic.

For example, the band characteristic of the band-pass filter is regulated so as to have ±20 MHz at fc=2488.32 MHz, ±80 MHz at fc=9953.28 MHz, and ±320 MHz at fc=39813.12 MHz.

The output signal from the band-pass filter 23 is amplified by an amplifier 24.

The output signal from the amplifier 24 is inputted to a binarizing circuit 25.

This binarizing circuit 25 is configured from a logic gate element, a high-speed converter, and the like, and for example, outputs, as a clock signal C, a signal which becomes high level when the voltage of the output signal from the amplifier 24 is greater than or equal to a predetermined threshold value Vr and becomes low level when the voltage of the output signal from the amplifier 24 is lower than the predetermined threshold value Vr.

Further, the clock signal C, regenerated by the clock regenerating circuit 21 having the binarizing circuit 25, is inputted to the error measuring portion 30 and the jitter/wander measuring portion 35.

Here, the error measuring circuit 30 is configured from a code reading circuit 31 reading codes of the data signal Da by the clock signal C, a code comparing module 32 comparing the code array read at the code reading circuit 31 with a predetermined code array, and an error ratio calculating module 33 receiving the results of comparison of the code comparing module 32 and calculating an error ratio E.

Further, the jitter/wander measuring portion 35 is configured from a phase difference detecting circuit 36 which detects a phase difference of a reference clock signal of the clock signal C, a jitter calculating module 37 which extracts a phase fluctuation component (jitter) of a signal component greater than or equal to the frequency 10 Hz from the phase difference detecting circuit 36 and which determines a jitter amount J, and a wander calculating module 38 which extracts a phase fluctuation component (wander) of a signal component less than or equal to the frequency 10 Hz from the phase difference detecting circuit 36 and which determines a wander amount J.

Next, operation of the clock regenerating circuit 21 of the measuring device 20 will be described.

In the same way as described above, as shown in FIG. 2A, if the data signal Da corresponding to a code array of 0, 1 is inputted to the data converter 22, as shown in FIG. 2B, an RZ method data signal Pb is outputted from the data converter 22.

The RZ method data signal Db is formed from a pulse array which, after rising to a high level in synchronization with the code inversion of the data signal Da, returns to a low level, and is maintained as is at the low level during a period in which the codes of the data signal Da are not inverted.

Accordingly, as shown in FIG. 2C, during a period in which there are pulses of the data signal Db, a sine wave shaped signal A having a predetermined amplitude with respect to the pulses is outputted from the band-pass filter 23, Further, as shown in FIG. 2C, when there is no pulse of the data signal Db, a damping signal A', having a minute amplitude accompanying relaxation vibration at the interior of the band-pass filter 23 with respect to the pulses inputted until that time, is outputted from the band-pass filter 23.

Here, relaxation vibration at the interior of the band-pass filter 23 is, as described above, when there is a period in which the same code continues markedly in the data signal, a phenomenon of vibration at the interior of the band-pass filter with respect to the data signal inputted until immediately before that period.

The relaxation vibration at the interior of the band-pass filter depends on the wideness/narrowness of the band characteristic of the band-pass filter.

Namely, when the band characteristic of the band-pass filter, extracting a signal component having a frequency the same as that of the clock signal to be regenerated from the data signal to be measured which is transmitted at a predetermined carrier wave frequency, is regulated to a narrow band characteristic in accordance with the aforementioned predetermined carrier wave frequency in consideration of the measurement of the jitter characteristic, relaxation vibration at the interior of the band-pass filter markedly appears.

In the damping signal A' based on such relaxation vibration at the interior of the band-pass filter, the phase continues at the same frequency as the signal A outputted at the time the pulse is inputted, and the amplitude decreases in an index-like manner in accordance with the passage of time.

Further, the narrower the passage band of the band-pass filter 23 is, the longer the time, in which the amplitude continues at a predetermined value or more, becomes.

The signal outputted from the band-pass filter 23 is amplified at the amplifier 24 as shown in FIG. 2D.

Here, the amplifier 24 amplifies the sine wave shaped signal A having a predetermined amplitude to a saturation level as a signal B shown in FIG. 2D, and amplifies the damping signal A' having a minute amplitude to a sufficiently large amplitude level as a signal B' shown in FIG. 2D, and outputs them to the binarizing circuit 25.

Note that, as described above, when the passage band of the band-pass filter 23 is narrow, the time in which the amplitude of the damping signal A' continues at a predetermined value or more becomes long. Therefore, the amplifier 24 may be omitted and the output signal of the band-pass filter 23 may be directly inputted to the binarizing circuit 25.

Further, the binarizing circuit 25 binarizes the output signal (or the output signal of the band-pass filter 23) from the amplifier 24 by a threshold value voltage Vr close to the center of the amplitude, and outputs the binarized signal as the clock signal C.

Here, as described above, even during the period in which there is no pulse array of the data signal Db, the damping signal A' by relaxation vibration is outputted from the band-pass filter 23, and binarizing by the predetermined threshold value voltage Vr is carried out at the binarizing circuit 25 on the amplified output of the damping signal A'.

Therefore, due to the gain of the amplifier 24 being set to be high, the clock signal can be continuously outputted, from the binarizing circuit 25, until the amplitude of the damping signal A' becomes extremely small.

Accordingly, due to binarizing by the predetermined threshold value voltage Vr being carried out by the binarizing circuit 25, even when the NRZ method data signal Da continues at the same code, namely, even when the RZ method data signal Db continues at the same level of a plurality of bits, the absence period of the clock signal can be eliminated or extremely shortened.

When the method in which the absence of the clock signal is compensated for by using the above-described conventional delay adding circuit 12, and the method in which binarizing by the predetermined threshold value voltage Vr is carried out by the binarizing circuit 25 on the signal from the band-pass filter 23 as in the above described present invention, are compared, a remarkable difference can be seen between the two.

Namely, in the conventional method, although correspondence to about 70 bits of the same code is the limit, in the method of the present invention, tolerance up to 88 bits of the same code can be obtained.

FIG. 3 is an output waveform diagram of the binarizing circuit 25 shown for explaining operation of the clock regenerating circuit used for the measuring device of FIG. 1.

Namely, as shown in FIG. 3, only the original clock signal component a is contained in the output waveform of the binarizing circuit 25.

A particular difference can be seen as compared with the fact that the various noise components b, c, d, e, or the like are superposed and appear, in addition to the original clock signal component a, in the output waveform of the saturation amplifier or the AGC amplifier in the conventional clock regenerating circuit shown in FIGS. 12A, C.

Namely, because such various noise components are not superposed on the output waveform of the binarizing circuit 25, the clock signal to be regenerated is correctly regenerated as the clock signal. Absence of the clock signal is prevented, and phase fluctuation does not occur in the regenerated clock signal.

Further, as shown in FIG. 12E, in accordance with the clock regenerating circuit using the binarizing circuit 25 according to the present embodiment, it can be correctly regenerated as a clock signal, even in the same code continuing period in which it was not be able to be correctly regenerated as a clock signal, in the conventional clock regenerating circuit regenerating the clock signal by using the saturation amplifier or the AGC amplifier.

This is because, in the conventional clock regenerating circuit regenerating the clock signal by using the saturation amplifier or the AGC amplifier, due to the portion working in a non-saturation region being binarized at a predetermined threshold value at the binarizing circuit 25, it is possible to distinguish it as the clock signal.

In accordance with this as well, it can be understood that waveform shaping and same code continuing tolerance are greatly improved in the clock regenerating circuit using the binarizing circuit 25 as in the method of the present invention.

Further, with such a clock signal, identification of a data signal and measurement of jitter or the like can be correctly carried out.

In this way, the absence of the clock signal during the period in which the same code continues is prevented due to binarizing by the predetermined threshold value voltage Vr being carried out by the binarizing circuit 25 by using relaxation vibration at the interior of the band-pass filter 23. Therefore, the clock regenerating circuit 21 can prevent absence of the clock signal during a long period with a simple configuration and without need of adjustment.

Accordingly, the error measuring portion 30, which carries out reading of codes by using the clock signal C and measures the error ratio of the read codes, can correctly carry out the reading of the code, and can correctly measure the error ratio, even if it is the data signal Da in which the same code continues.

Further, also in the jitter/wander measuring portion 35 which detects fluctuations of the phase of the clock signal C and measures jitter or wander, measurement errors caused by the absence of the clock signal C or the phase fluctuations due to the clock regenerating circuit 21 itself can be decreased extremely. Therefore, accurate measurement is possible.

Second Embodiment

FIG. 4 is a block diagram showing a configuration of a second embodiment of the clock regenerating circuit for use in the measuring device according to the present invention.

In the clock regenerating circuit 21 for use in the measuring device according to the above-described first embodiment, the output signal of the binarizing circuit 25 is outputted as a clock signal component C.

However, when a sine wave shaped clock signal is needed at the error measuring portion 30 or the jitter/wander measuring portion 35, a clock regenerating circuit 41 as shown in FIG. 4 can be used.

The clock regenerating circuit 41 inputs the output signal of the binarizing circuit 25 to another band-pass filter 26 formed to be the same level as the band characteristic or the like of the band-pass filter 23, and outputs the sine wave shaped clock signal C from the band-pass filter 26.

Namely, in the clock regenerating circuit 41 used in this embodiment, the aforementioned band-pass filter 23 and the aforementioned binarizing circuit 25 are made to be one circuit group, and a plurality of these circuit groups are connected in series.

Third Embodiment

FIG. 5 is a block diagram showing a configuration of a third embodiment of the clock regenerating circuit for use in the measuring device according to the present invention.

In the aforementioned clock regenerating circuits 21, 41, the RZ method data signal Db outputted from the data converter 22 is directly inputted to the band-pass filter 23.

However, when measurement of jitter having a wider band is carried out, it is necessary to widen the passage band of the band-pass filter 23 in order not to damper the jitter component. Therefore, the duration time of relaxation vibration at the interior of the band-pass filter 23 becomes much shorter correspondingly.

In such a case, for example, as in the case of a clock regenerating circuit 51 as shown in FIG. 5, a plurality of groups of the group of the band-pass filter 23, the amplifier 24, and the binarizing circuit 25 are connected in series. If the absence of the clock signal is eliminated or the absence period is shortened, jitter having a wider band can be precisely measured.

In this case, the band characteristics of the band-pass filters 23 of the respective groups are set on the whole so as to cover the necessary passage bands due to the central frequencies being offset from each other although the bands themselves are the same level.

Note that, in this way, even when a plurality of groups of the group of the band-pass filter 23, the amplifier 24, and the binarizing circuit 25 are provided in series, as compared with the case in which the above-described conventional delay adding circuits 12 are connected at many stages, fluctuations in the phase do not occur and the effects on the measurement of the error measuring portion 30 or the jitter/wander measuring portion 35 are extremely small.

Fourth Embodiment

FIG. 6A is a block diagram showing a configuration of main portions of a fourth embodiment of the clock regenerating circuit for use in the measuring device according to the present invention.

FIG. 6B is a figure showing the relationship of the same code tolerance with respect to a threshold value voltage of the binarizing circuit in the clock regenerating circuit of FIG. 6A, made into a table.

In the above-described clock regenerating circuits 21, 41, 51, at the binarizing circuit 25, the output signal (or the output signal of the band-pass filter 23) from the amplifier 24 is binarized by the threshold value voltage Vr close to the center of the amplitude, and the binarized signal is outputted as the clock signal C.

However, according to the findings of the present inventor, it has been found that the same code continuing tolerance with respect to the optimal threshold value of the binarizing circuit in the clock regenerating circuit of the present invention has a correlating relationship as shown in FIG. 6B.

For example, when the same code continuation is 6 bytes, the threshold value voltage Vslice (V), which optimizes the same code tolerance of the binarizing circuit 25, is −0.435 V (wherein the remaining jitter as a reference value is 0.037 to 0.046 UIpp).

Further, when the same code continuation is 5 bytes, the threshold value voltage Vslice (V), which optimizes the same code tolerance of the binarizing circuit 25, is −0.423 V (wherein the remaining jitter as a reference value is 0.039 to 0.042 UIpp).

Further, when the same code continuation is 4 bytes, the threshold value voltage V slice (V), which optimizes the same code tolerance of the binarizing circuit 25, is −0.384 V (wherein the remaining jitter as a reference value is 0.035 to 0.040 UIpp).

Further, when the same code continuation is 3 bytes, the threshold value voltage Vslice (V), which optimizes the same code tolerance of the binarizing circuit 25, is −0.384 V (wherein the remaining jitter as a reference value is 0.034 to 0.037 UIpp).

This is a relationship which is not ensured even if, as in the above-described clock regenerating circuits 21, 41, 51, the threshold value voltage Vr of the binarizing circuit 25 is simply set to a value close to the center of the amplitude of the output signal (or the output signal of the band-pass filter 23) from the amplifier 24.

Accordingly, in the fourth embodiment, it is set to the threshold value voltage Vslice (V) of the binarizing circuit 25 such that the desired same code tolerance can be ensured by configuring a clock regenerating circuit 61 as shown in FIG. 6A based on the relationships as shown in above-described FIG. 6B.

Fifth Embodiment

FIG. 7 is a block diagram showing a configuration of main portions of a fifth embodiment of the clock regenerating circuit in which the above-described clock regenerating circuit of the fourth embodiment is developed and which is used in the measuring device according to the present invention.

Namely, a clock regenerating circuit 71 used in the measuring device according to the fifth embodiment has a phase difference detecting module 136 having a phase synchronizing loop module 139 including a phase comparator 136A comparing the phases of the reference clock signal and the clock signal outputted from the binarizing circuit 25 of FIG. 6A and detecting the phase difference, and a voltage controlling (crystal) oscillator (VCXO) module 138 outputting a signal having a predetermined frequency, as the aforementioned reference clock signal to the aforementioned phase comparator 136A via a loop filter 137, based on the voltage output corresponding to the phase difference detected by the difference detecting module 136 and the phase comparator 136A, and a clock signal absence detecting module 140 detecting the absence of the clock signal during the aforementioned period in the clock signal outputted from the binarizing circuit 25 based on the phase difference detected by the aforementioned phase comparator 136A of the aforementioned phase synchronizing loop module 139, and a threshold value calculating module 143 including a CPU 141 calculating an optical threshold value voltage Vslice (V) satisfying the relationships as shown in FIG. 6B, in order to compensate for the absence of the clock signal during the aforementioned period in the binarizing circuit 25, based on the voltage output corresponding to the phase difference detected by the aforementioned phase comparator 136A, when the absence of the clock signal during the aforementioned period is detected by the clock signal absence detecting module 140 of the phase difference detecting module 136, and a D/A converter module 142 converting the optimal threshold value voltage Vslice (V) by the digital signal from the CPU 141 to an analog signal and supplying it to the aforementioned binarizing circuit 25.

In accordance with such a configuration, it can be set to the threshold value voltage Vslice (V) of the binarizing circuit 25 such that the same code continuing tolerance is always optimal.

Sixth Embodiment

Figure 8:
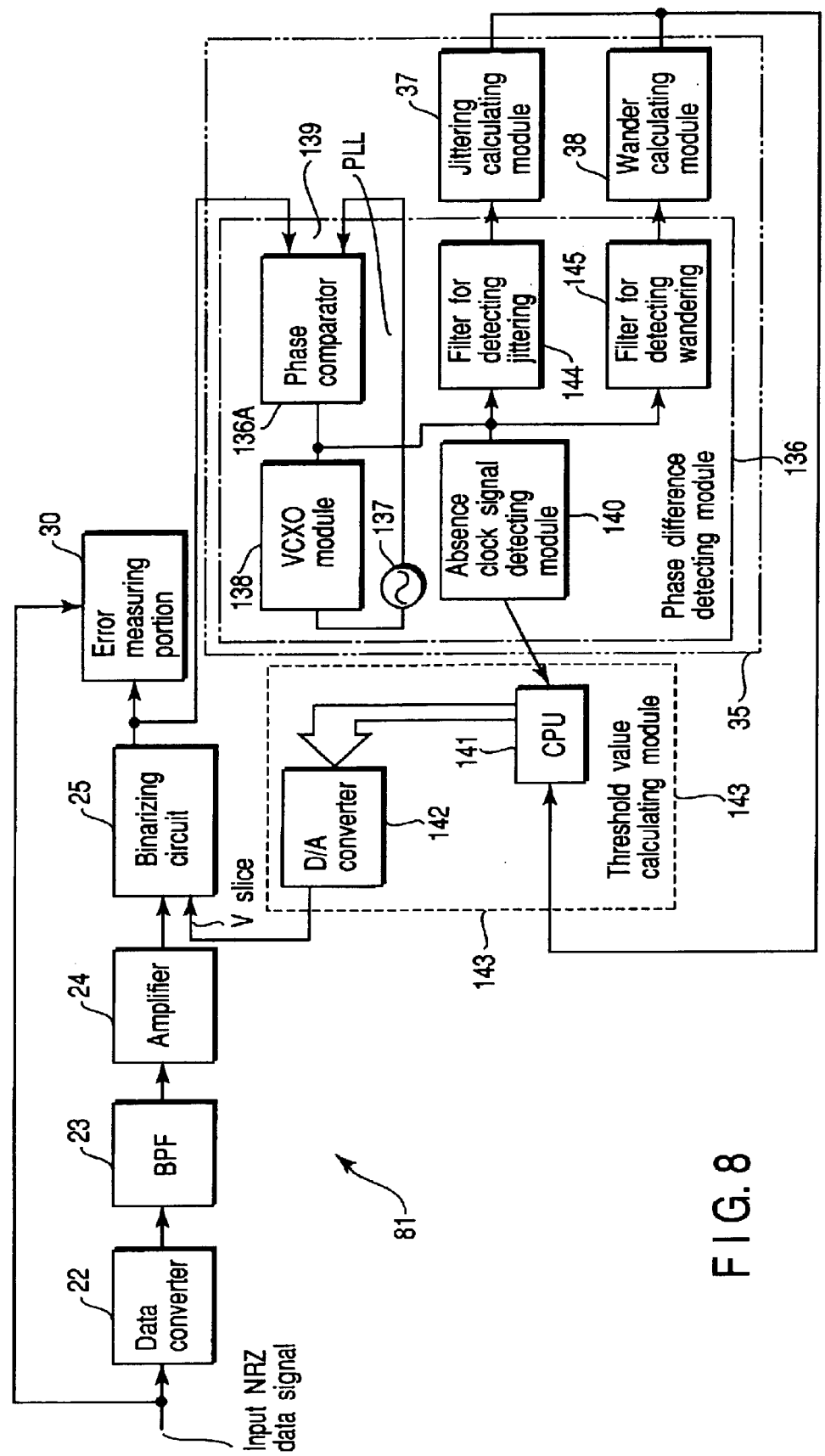
FIG. 8 is a block diagram showing a configuration of main portions of a sixth embodiment of a clock regenerating circuit for use in the measuring device according to the present invention.

FIG. 8 is a block diagram showing a configuration of main portions of a sixth embodiment of the clock regenerating circuit in which the clock regenerating circuit of the above-described fifth embodiment is developed further and which is used in the measuring device according to the present invention.

Namely, due to the phase difference detecting module 136 of FIG. 7 being also used as the phase difference detecting module 36 of the jitter/wander measuring portion 35 as shown in FIG. 1, a clock regenerating circuit 81 used in the measuring device according to the sixth embodiment can set to the threshold value voltage Vslice (V) of the binarizing circuit 25 such that the same code continuing tolerance is always optimal, and in addition, simplification of the configuration of the entire measuring device is attempted.

In FIG. 8, parts which are the same as in above-described FIG. 7 are denoted by the same reference numerals, and description thereof will be omitted.

Namely, in this embodiment, the output from the phase comparator 136A of FIG. 7 is supplied to the jitter calculating module 37 and the wander calculating module 38 in the jitter/wander measuring portion 35 of FIG. 1 via a filter 144 for jitter detection and a filter 145 for wander detection.

In this case, due to the outputs of the jitter calculating module 37 and the wander calculating module 38 being fed back to the threshold value calculating module 143, it can be such that the threshold value voltage Vslice (V) supplied to the binarizing circuit 25 becomes more optimum by adding the actually-measured jitter characteristic and wander.

Note that all of the clock regenerating circuits 21, 41, 51, 61, 71, 81 for use in the measuring devices according to the above-described first through sixth embodiments are used for the measuring device 20 carrying out an error measurement or measurement of jitter/wander with respect to the data transmitting system.

However, the clock regenerating circuits 21, 41, 51, 61, 71, 81 for use in the measuring devices according to the above-described first through sixth embodiments can also be used for uses of other measuring devices or the like.

In this case, it is not limited to regeneration of the clock signal being carried out after the NRZ method data signal Da is converted to the RZ method data signal Db by the data converter 22 as described above.

Namely, the data converter 22 may be omitted from the above-described respective clock regenerating circuits 21, 41, 51, 61, 71, 81, and the data signal inputted in the RZ method may be directly inputted to the band-pass filter 23, and the clock signal may be regenerated.

As described above, the measuring device according to the first aspect of the present invention comprises: a data converter 22 converting a data signal transmitted at a predetermined carrier wave frequency from an NRZ method data signal to an RZ method data signal; a band-pass filter 23 extracting a signal component having a frequency the same as that of a clock signal to be regenerated from the RZ method data signal converted by the data converter 22, and having a predetermined band characteristic regulated in accordance with the predetermined carrier wave frequency; a binarizing circuit 25 binarizing, at a predetermined threshold value, the signal component extracted by the band-pass filter 23, and outputting the binarized signal as the clock signal to be regenerated, and when there is a period in which the data signal inputted to the band-pass filter 23 continues for a plurality of bits at the same level, the binarizing circuit 25 is configured so as to compensate for absence of the clock signal during the period by binarizing, at the threshold value, the signal which the band-pass filter 23 outputs during the period due to relaxation vibration at an interior of the band-pass filter 23 with respect to the data signal inputted until immediately before the period; and calculating modules (33, 37, 38) calculating at least one of an error ratio, jitter, and wander accompanying transmission of the data signal, based on the clock signal outputted from the binarizing circuit.

Therefore, the measuring device according to the first aspect of the present invention can correctly measure at least one of an error ratio, jitter, and wander accompanying transmission of the above-described data signal, by the clock signal in which there is no absence or an absence period is extremely short and which is outputted from the binarizing circuit 25 configured so as to compensate for the absence of the clock signal during a period in which the same code continues.

Further, in the measuring device according to the second aspect of the present invention, in the measuring device according to the first aspect, the measuring device is a device carrying out measurement of the error ratio, and the calculating module, in an error measuring portion 30, comprises: a code reading module 31 reading a code of the NRZ method data signal based on the clock signal outputted from the binarizing circuit; a code comparing module 32 comparing the code array read by the code read module 31 and a reference code array; and an error ratio calculating module 33 calculating the error ratio based on results of comparison of the code comparing module 32.

Therefore, the measuring device according to the second aspect of the present invention can correctly measure the error ratio by the clock signal in which there is no absence or an absence period is extremely short and which is outputted from the binarizing circuit 25 configured so as to compensate for the absence of the clock signal during a period in which the same code continues.

Further, in the measuring device according to the third aspect of the present invention, in the measuring device according to the first aspect, the measuring device is a device carrying out measurement of at least one of the jitter and the wander, and the band-pass filter 23 has a predetermined band characteristic regulated in accordance with the predetermined carrier wave frequency and measurement of at least one of the jitter and the wander; when there is a period in which the data signal inputted to the band-pass filter 23 continues for a plurality of bits at the same level, the binarizing circuit 25 binarizes, at a threshold value corresponding to the measurement of at least one of the jitter and the wander, the signal which the band-pass filter 23 outputs during the period due to relaxation vibration at the interior of the band-pass filter 23 with respect to the data signal inputted until immediately before the period; and the calculating module, in a jitter/wander measuring portion, comprises: a phase difference detecting module 36 detecting a phase difference of the clock signal outputted from the binarizing circuit and a reference clock signal; and a calculating modules 37, 38 calculating at least one of the jitter and the wander based on the phase difference detected by the phase difference detecting module.

Therefore, the measuring device according to the third aspect of the present invention can correctly measure at least one of the jitter and the wander by the clock signal in which there is no absence or an absence period is extremely short and which is outputted from the binarizing circuit configured so as to compensate for the absence of the clock signal during a period in which the same code continues.

Further, in the measuring device according to the fourth aspect of the present invention, in the measuring device according to the first aspect, the band-pass filter 23 and the binarizing circuit 25 are made to be one circuit group and a plurality of the one circuit group are connected in series.

Therefore, the measuring device according to the fourth aspect of the present invention can correctly measure at least one of the error ratio, the jitter, and the wander, by the clock signal in which there is no absence or an absence period is extremely short and which is outputted from the binarizing circuit 25 configured so as to compensate, continuously and for an even longer period, for the absence of the clock signal during a period in which the same code continues.

Further, the measuring device according to the fifth aspect of the present invention, in the measuring device according to the first aspect, further comprises: an amplifier 24 provided between the band-pass filter 23 and the binarizing circuit 25, and amplifying the signal component extracted by the band-pass filter 23 and outputting it to the binarizing circuit 25.

Therefore, the measuring device according to the fifth aspect of the present invention can correctly measure at least one of the error ratio, the jitter, and the wander, by the clock signal in which there is no absence or an absence period is extremely short and which is outputted from the binarizing circuit 25 configured so as to compensate, continuously and for an even longer period, for the absence of the clock signal during a period in which the same code continues.

Further, in the measuring device according to the sixth aspect of the present invention, the threshold value of the binarizing circuit 25 is set to a threshold value voltage Vslice (V) able to ensure a desired same code continuing tolerance.

Therefore, the measuring device according to the sixth aspect of the present invention can correctly measure at least one of the error ratio, the jitter, and the wander, by the clock signal in which there is no absence or an absence period is extremely short and which is outputted from the binarizing circuit 25 configured so as to ensure a desired same code continuing tolerance, in order to compensate, continuously and for an even longer period, for the absence of the clock signal during a period in which the same code continues.

Further, the measuring device according to the seventh aspect of the present invention, in the measuring device according to the first aspect, further comprises: a phase difference detecting module 136 for calculating a threshold value having a phase synchronizing loop module 139, including a phase comparator 136A detecting a phase difference between the clock signal outputted from the binarizing circuit 25 and the reference clock signal and a voltage controlling oscillator module 138 outputting a signal having a predetermined frequency as the reference clock signal to the phase comparator 136A based on a voltage output corresponding to the phase difference detected by the phase comparator 136A, and a clock signal absence detecting module 140 detecting absence of the clock signal during the period in the clock signal outputted from the binarizing circuit 25 based on the phase difference detected by the phase comparator 136A of the phase synchronizing loop module 139; and a threshold value calculating module 143 calculating an optimal threshold value voltage Vslice (V) for compensating for absence of the clock signal during the period in the binarizing circuit 25 and supplying it to the binarizing circuit 25, based on the voltage output corresponding to the phase difference detected by the phase comparator 136A of the phase difference detecting module 136 for calculating the threshold value, when absence of the clock signal during the period is detected by the clock signal absence detecting module 140 of the phase difference detecting module 136 for calculating the threshold value.

Therefore, the measuring device according to the seventh aspect of the present invention can correctly measure at least one of the error ratio, the jitter, and the wander, by the clock signal in which there is no absence or an absence period is extremely short and which is outputted from the binarizing circuit 25 configured such that the same code continuing tolerance is always optimal, in order to compensate, continuously and for an even longer period, for the absence of the clock signal during a period in which the same code continues.

Further, in the measuring device according to the eighth aspect of the present invention, in the measuring device according to the seventh aspect, the measuring device is a device carrying out measurement of at least one of the jitter and the wander, and the band-pass filter 23 has a predetermined band characteristic regulated in accordance with the predetermined carrier wave frequency and measurement of at least one of the jitter and the wander; when there is a period in which the data signal inputted to the band-pass filter 23 continues for a plurality of bits at the same level, the binarizing circuit 25 binarizes, at a threshold value corresponding to the measurement of at least one of the jitter and the wander, the signal which the band-pass filter 23 outputs during the period due to relaxation vibration at the interior of the band-pass filter 23 with respect to the data signal inputted until immediately before the period; the calculating module, in a jitter/wander measuring portion 35, comprises: a phase difference detecting module 36 detecting a phase difference of the clock signal outputted from the binarizing circuit 25 and a reference clock signal; and calculating modules (37, 38) calculating at least one of the jitter and the wander based on the phase difference detected by the phase difference detecting module 36; and the phase difference detecting module 36 of the jitter/wander measuring portion 35 is also used as the phase difference detecting module 136 for calculating a threshold value.

Therefore, the measuring device according to the eighth aspect of the present invention can correctly measure at least one of the error ratio, the jitter, and the wander, by the clock signal in which there is no absence or an absence period is extremely short and which is outputted from the binarizing circuit 25 configured so as to compensate, continuously and for an even longer period, for the absence of the clock signal during a period in which the same code continues, and can set to the threshold value voltage Vslice (V) of the binarizing circuit 25 such that the same code continuing tolerance is always optimal by using the phase difference detecting module 136 for calculating a threshold value also as the phase difference detecting module 36 of the jitter/wander measuring portion 35, and in addition, can aim for simplification of the configuration of the entire device.

Further, a clock regenerating circuit in accordance with the ninth aspect of the present invention is used in a measuring device measuring at least one of the error ratio, jitter, and wander accompanying transmission of a data signal, based on a clock signal outputted from the binarizing circuit 25, and comprises: a data converter 22 converting a data signal transmitted at a predetermined carrier wave frequency from an NRZ method data signal to an RZ method data signal; a band-pass filter 23 extracting a signal component having a frequency the same as that of a clock signal to be regenerated from the RZ method data signal converted by the data converter 22, and having a predetermined band characteristic regulated in accordance with the predetermined carrier wave frequency; and a binarizing circuit 25 binarizing, at a predetermined threshold value, the signal component extracted by the band-pass filter 23, and outputting the binarized signal as the clock signal to be regenerated, and when there is a period in which the data signal inputted to the band-pass filter 23 continues for a plurality of bits at the same level, the binarizing circuit is configured so as to compensate for absence of the clock signal during the period by binarizing, at the threshold value, the signal which the band-pass filter outputs during the period due to relaxation vibration at an interior of the band-pass filter 23 with respect to the data signal inputted until immediately before the period.

Therefore, the clock regenerating circuit according to the ninth aspect of the present invention can correctly measure at least one of the error ratio, jitter, and wander by the clock signal in which there is no absence or an absence period is extremely short and which is outputted from the binarizing circuit 25 configured so as to compensate for the absence of the clock signal during a period in which the same code continues.

Further, in the clock regenerating circuit according to the tenth aspect of the present invention, in the clock regenerating circuit according to the ninth aspect, when the measuring device is a measuring device carrying out measurement of at least one of the jitter and the wander, the band-pass filter 23 has a predetermined band characteristic regulated in accordance with the predetermined carrier wave frequency and measurement of at least one of the jitter and the wander; and when there is a period in which the data signal inputted to the band-pass filter 23 continues for a plurality of bits at the same level, the binarizing circuit 25 binarizes, at a threshold value corresponding to the measurement of at least one of the jitter and the wander, the signal which the band-pass filter 23 outputs during the period due to relaxation vibration at the interior of the band-pass filter 23 with respect to the data signal inputted until immediately before the period.

Therefore, the clock regenerating circuit according to the tenth aspect of the present invention can correctly measure at least one of the jitter and wander by the clock signal in which there is no absence or an absence period is extremely short and which is outputted from the binarizing circuit 25 configured so as to compensate for the absence of the clock signal during a period in which the same code continues.

Further, in the clock regenerating circuit according to the eleventh aspect of the present invention, in the clock regenerating circuit according to the ninth aspect, the band-pass filter 23 and the binarizing circuit 25 are made to be one circuit group and a plurality of the one circuit group are connected in series.

Therefore, the clock regenerating circuit according to the eleventh aspect of the present invention can correctly measure at least one of the error ratio, jitter, and wander by the clock signal in which there is no absence or an absence period is extremely short and which is outputted from the binarizing circuit 25 configured so as to compensate, continuously and for an even longer period, for the absence of the clock signal during a period in which the same code continues.

Further, the clock regenerating circuit according to the twelfth aspect of the present invention, in the clock regenerating circuit according to the ninth aspect, further comprises: an amplifier 24 provided between the band-pass filter 23 and the binarizing circuit 25, and amplifying the signal component extracted by the band-pass filter 23 and outputting it to the binarizing circuit 25.

Therefore, the clock regenerating circuit according to the twelfth aspect of the present invention can correctly measure at least one of the error ratio, jitter, and wander by the clock signal in which there is no absence or an absence period is extremely short and which is outputted from the binarizing circuit 25 configured so as to compensate, continuously and for an even longer period, for the absence of the clock signal during a period in which the same code continues.

Further, in the clock regenerating circuit according to the thirteenth aspect of the present invention, in the clock regenerating circuit according to the ninth aspect, the threshold value of the is binarizing circuit 25 is set to a threshold value voltage Vslice (V) able to ensure a desired same code continuing tolerance.

Therefore, the clock regenerating circuit according to the thirteenth aspect of the present invention can correctly measure at least one of the error ratio, the jitter, and the wander, by the clock signal in which there is no absence or an absence period is extremely short and which is outputted from the binarizing circuit 25 configured so as to ensure a desired same code continuing tolerance, in order to compensate, continuously and for an even longer period, for the absence of the clock signal during a period in which the same code continues.

Further, the clock regenerating circuit according to the fourteenth aspect of the present invention, in the clock regenerating circuit according to the ninth aspect, further comprises: a phase difference detecting module 136 for calculating a threshold value having a phase synchronizing loop module 139, including a phase comparator 136A detecting a phase difference between the clock signal outputted from the binarizing circuit 25 and the reference clock signal and a voltage controlling oscillator module 138 outputting a signal having a predetermined frequency as the reference clock signal to the phase comparator 136A based on a voltage output corresponding to the phase difference detected by the phase comparator 136A, and a clock signal absence detecting module 140 detecting absence of the clock signal during the period in the clock signal outputted from the binarizing circuit 25 based on the phase difference detected by the phase comparator 136A of the phase synchronizing loop module 139; and a threshold value calculating module 143 calculating an optimal threshold value voltage Vslice (V) for compensating for absence of the clock signal during the period in the binarizing circuit 25 and supplying it to the binarizing circuit 25, based on the voltage output corresponding to the phase difference detected by the phase comparator 136A of the phase difference detecting module 136 for calculating the threshold value, when absence of the clock signal during the period is detected by the clock signal absence detecting module 140 of the phase difference detecting module 136 for calculating the threshold value.

Therefore, the clock regenerating circuit according to the fourteenth aspect of the present invention can correctly measure at least one of the error ratio, the jitter, and the wander, by the clock signal in which there is no absence or an absence period is extremely short and which is outputted from the binarizing circuit 25 configured such that the same code continuing tolerance is always optimal, in order to compensate, continuously and for an even longer period, for the absence of the clock signal during a period in which the same code continues.

Further, in the clock regenerating circuit according to the fifteenth aspect of the present invention, in the clock regenerating circuit according to the fourteenth aspect, when the measuring device is a device carrying out measurement of at least one of the jitter and the wander, the band-pass filter 23 has a predetermined band characteristic regulated in accordance with the predetermined carrier wave frequency and measurement of at least one of the jitter and the wander;

when there is a period in which the data signal inputted to the band-pass filter 23 continues for a plurality of bits at the same level, the binarizing circuit 25 binarizes, at a threshold value corresponding to the measurement of at least one of the jitter and the wander, the signal which the band-pass filter 23 outputs during the period due to relaxation vibration at the interior of the band-pass filter 23 with respect to the data signal inputted until immediately before the period;

the calculating module, in a jitter/wander measuring portion 35, comprises: a phase difference detecting module 36 detecting a phase difference of the clock signal outputted from the binarizing circuit 25 and the reference clock signal; and calculating modules (37, 38) calculating at least one of the jitter and the wander based on the phase difference detected by the phase difference detecting module 36; and the phase difference detecting module 36 of the jitter/wander measuring portion 35 is also used as the phase difference detecting module 136 for calculating the threshold value.

Therefore, the clock regenerating circuit according to the fifteenth aspect of the present invention can correctly measure at least one of the error ratio, the jitter, and the wander, by the clock signal in which there is no absence or an absence period is extremely short and which is outputted from the binarizing circuit 25 configured so as to compensate, continuously and for an even longer period, for the absence of the clock signal during a period in which the same code continues, and can set to the threshold value voltage Vslice (V) of the binarizing circuit 25 such that the same code continuing tolerance is always optimal by using the phase difference detecting module 136 for calculating a threshold value also as the phase difference detecting module 36 of the jitter/wander measuring portion 35, and in addition, can aim for simplification of the configuration of the entire device.

What is claimed is:

1. A measuring device comprising:
   a data converter which converts a data signal transmitted at a predetermined carrier wave frequency from an NRZ method data signal to an RZ method data signal;

a band-pass filter which extracts a signal component having a frequency the same as that of a clock signal to be regenerated from the RZ method data signal converted by the data converter, and has a predetermined band characteristic regulated in accordance with the predetermined carrier wave frequency;

a binarizing circuit which binarizes, at a predetermined threshold value, the signal component extracted by the band-pass filter, and outputs a binarized signal as the clock signal to be regenerated, and when there is a period in which the data signal inputted to the band-pass filter continues for a plurality of bits at the same level, the binarizing circuit being configured so as to compensate for absence of the clock signal during the period by binarizing, at the predetermined threshold value, the signal which the band-pass filter outputs during the period due to relaxation vibration at an interior of the band-pass filter with respect to the data signal inputted until immediately before the period; and a calculating module which calculates at least one of an error ratio, jitter, and wander accompanying transmission of the data signal, based on the clock signal outputted from the binarizing circuit.

2. The measuring device according to claim 1, wherein the measuring device is a device carrying out measurement of the error ratio, and the calculating module, in an error measuring portion, comprises:

a code reading module which reads a code of the NRZ method data signal based on the clock signal outputted from the binarizing circuit;

a code comparing module which compares the code array read by the code read module and a reference code array; and an error ratio calculating module which calculates the error ratio based on results of comparison of the code comparing module.

3. The measuring device according to claim 1, wherein the measuring device is a device carrying out measurement of at least one of the jitter and the wander, and the band-pass filter has a predetermined band characteristic regulated in accordance with the predetermined carrier wave frequency and measurement of at least one of the jitter and the wander;

when there is a period in which the data signal inputted to the band-pass filter continues for a plurality of bits at the same level, the binarizing circuit binarizes, at a threshold value corresponding to the measurement of at least one of the jitter and the wander, the signal which the band-pass filter outputs during the period due to relaxation vibration at the interior of the band-pass filter with respect to the data signal inputted until immediately before the period; and the calculating module, in a jitter/wander measuring portion, comprises:

a phase difference detecting module which detects a phase difference of the clock signal outputted from the binarizing circuit and a reference clock signal; and a calculating module which calculates at least one of the jitter and the wander based on the phase difference detected by the phase difference detecting module.

4. The measuring device according to claim 1, wherein the band-pass filter and the binarizing circuit are made to be one circuit group and a plurality of the one circuit group are connected in series.

5. The measuring device according to claim 1, further comprising:

an amplifier which is provided between the band-pass filter and the binarizing circuit, and amplifies the signal component extracted by the band-pass filter and outputs it to the binarizing circuit.

6. The measuring device according to claim 1, wherein the threshold value of the binarizing circuit is set to a threshold value voltage able to ensure a desired same code continuing tolerance.

7. The measuring device according to claim 1, further comprising:

a phase difference detecting module for calculating a threshold value, comprising: a phase synchronizing loop module including a phase comparator which detects a phase difference between the clock signal outputted from the binarizing circuit and the reference clock signal and a voltage controlling oscillator module which outputs a signal having a predetermined frequency as the reference clock signal to the phase comparator based on a voltage output corresponding to the phase difference detected by the phase comparator; and a clock signal absence detecting module which detects absence of the clock signal during the period in the clock signal outputted from the binarizing circuit based on the phase difference detected by the phase comparator of the phase synchronizing loop module; and a threshold value calculating module which calculates an optimal threshold value to compensate for absence of the clock signal during the period in the binarizing circuit and supplies it to the binarizing circuit, based on the voltage output corresponding to the phase difference detected by the phase comparator of the phase difference detecting module for calculating the threshold value, when absence of the clock signal during the period is detected by the clock signal absence detecting module of the phase difference detecting module for calculating the threshold value.

8. The measuring device according to claim 7, wherein the measuring device is a device carrying out measurement of at least one of the jitter and the wander, and the band-pass filter has a predetermined band characteristic regulated in accordance with the predetermined carrier wave frequency and measurement of at least one of the jitter and the wander;

when there is a period in which the data signal inputted to the band-pass filter continues for a plurality of bits at the same level, the binarizing circuit binarizes, at a threshold value corresponding to the measurement of at least one of the jitter and the wander, the signal which the band-pass filter outputs during the period due to relaxation vibration at the interior of the band-pass filter with respect to the data signal inputted until immediately before the period;

the calculating module, in a jitter/wander measuring portion, comprises:

a phase difference detecting module which detects a phase difference of the clock signal outputted from the binarizing circuit and a reference clock signal; and a calculating module which calculates at least one of the jitter and the wander based on the phase difference detected by the phase difference detecting module; and the phase difference detecting module of the jitter/wander measuring portion is also used as the phase difference detecting module for calculating the threshold value.

9. A clock regenerating circuit for use in a measuring device measuring at least one of an error ratio, jitter, and wander accompanying transmission of a data signal, based on a clock signal outputted from a binarizing circuit, the clock regenerating circuit comprising:

a data converter which converts a data signal transmitted at a predetermined carrier wave frequency from an NRZ method data signal to an RZ method data signal;

a band-pass filter which extracts a signal component having a frequency the same as that of a clock signal to be regenerated from the RZ method data signal converted by the data converter, and has a predetermined band characteristic regulated in accordance with the predetermined carrier wave frequency; and a binarizing circuit which binarizes, at a predetermined threshold value, the signal component extracted by the band-pass filter, and outputs a binarized signal as the clock signal to be regenerated, and when there is a period in which the data signal inputted to the band-pass filter continues for a plurality of bits at the same level, the binarizing circuit being configured so as to compensate for absence of the clock signal during the period by binarizing, at the predetermined threshold value, the signal which the band-pass filter outputs during the period due to relaxation vibration at an interior of the band-pass filter with respect to the data signal inputted until immediately before the period.

10. The clock regenerating circuit according to claim 9, wherein when the measuring device is a measuring device carrying out measurement of at least one of the jitter and the wander, the band-pass filter has a predetermined band characteristic regulated in accordance with the predetermined carrier wave frequency and measurement of at least one of the jitter and the wander; and when there is a period in which the data signal inputted to the band-pass filter continues for a plurality of bits at the same level, the binarizing circuit binarizes, at a threshold value corresponding to the measurement of at least one of the jitter and the wander, the signal which the band-pass filter outputs during the period due to relaxation vibration at the interior of the band-pass filter with respect to the data signal inputted until immediately before the period.

11. The clock regenerating circuit according to claim 9, wherein the band-pass filter and the binarizing circuit are made to be one circuit group and a plurality of the one circuit group are connected in series.

12. The clock regenerating circuit according to claim 9, further comprising:

an amplifier which is provided between the band-pass filter and the binarizing circuit, and amplifies the signal component extracted by the band-pass filter and outputs it to the binarizing circuit.

13. The clock regenerating circuit according to claim 9, wherein the threshold value of the binarizing circuit 25 is set to a threshold value voltage able to ensure a desired same code continuing tolerance.

14. The clock regenerating circuit according to claim 9, further comprising:

a phase difference detecting module for calculating a threshold value, comprising: a phase synchronizing loop module including a phase comparator which detects a phase difference between the clock signal outputted from the binarizing circuit and the reference clock signal and a voltage controlling oscillator module which outputs a signal having a predetermined frequency as the reference clock signal to the phase comparator based on a voltage output corresponding to the phase difference detected by the phase comparator; and a clock signal absence detecting module which detects absence of the clock signal during the period in the clock signal outputted from the binarizing circuit based on the phase difference detected by the phase comparator of the phase synchronizing loop module; and a threshold value calculating module which calculates an optimal threshold value to compensate for absence of the clock signal during the period in the binarizing circuit and supplies it to the binarizing circuit, based on the voltage output corresponding to the phase difference detected by the phase comparator of the phase difference detecting module for calculating the threshold value, when absence of the clock signal during the period is detected by the clock signal absence detecting module of the phase difference detecting module for calculating the threshold value.

15. The clock regenerating circuit according to claim 14, wherein when the measuring device is a device carrying out measurement of at least one of the jitter and the wander, the band-pass filter has a predetermined band characteristic regulated in accordance with the predetermined carrier wave frequency and measurement of at least one of the jitter and the wander;

when there is a period in which the data signal inputted to the band-pass filter continues for a plurality of bits at the same level, the binarizing circuit binarizes, at a threshold value corresponding to the measurement of at least one of the jitter and the wander, the signal which the band-pass filter outputs during the period due to relaxation vibration at the interior of the band-pass filter with respect to the data signal inputted until immediately before the period;

the calculating module, in a jitter/wander measuring portion, comprises:

a phase difference detecting module which detects a phase difference of the clock signal outputted from the binarizing circuit and a reference clock signal; and a calculating module which calculates at least one of the jitter and the wander based on the phase difference detected by the phase difference detecting module; and the phase difference detecting module of the jitter/wander measuring portion is also used as the phase difference detecting module for calculating the threshold value.

* * * * *